United States Patent
Cockerill et al.

(10) Patent No.: US 11,041,512 B2
(45) Date of Patent: Jun. 22, 2021

(54) ACTUATOR MODULE

(71) Applicant: Libertine FPE Limited, Yorkshire (GB)

(72) Inventors: Samuel Edward Cockerill, Yorkshire (GB); Edward Haynes, Yorkshire (GB)

(73) Assignee: Libertine FPE Limited, Yorkshire (GB)

( * ) Notice: Subject to any disclaimer, the term of this patent is extended or adjusted under 35 U.S.C. 154(b) by 279 days.

(21) Appl. No.: 16/086,175

(22) PCT Filed: Apr. 12, 2017

(86) PCT No.: PCT/GB2017/051016
§ 371 (c)(1),
(2) Date: Sep. 18, 2018

(87) PCT Pub. No.: WO2017/178814
PCT Pub. Date: Oct. 19, 2017

(65) Prior Publication Data
US 2020/0300274 A1    Sep. 24, 2020

(30) Foreign Application Priority Data
Apr. 14, 2016 (GB) ..................... 1606513

(51) Int. Cl.
*F15B 7/08*       (2006.01)
*F15B 15/18*      (2006.01)
(Continued)

(52) U.S. Cl.
CPC ............... *F15B 15/18* (2013.01); *F04B 9/10* (2013.01); *F04B 9/109* (2013.01); *F04B 17/04* (2013.01);
(Continued)

(58) Field of Classification Search
CPC .. F04B 9/10; F04B 9/109; F04B 17/04; F04B 17/048; H02K 7/1884
See application file for complete search history.

(56) References Cited

U.S. PATENT DOCUMENTS 5,347,186 A * 9/1994 Konotchick ......... H02K 7/1876
310/17
5,362,987 A * 11/1994 Cassaday ............... F15C 1/22
137/826
(Continued)

FOREIGN PATENT DOCUMENTS

EP    0118344 A1    9/1984
EP    2242168 A1    10/2010
(Continued)

OTHER PUBLICATIONS

International Search Report and Written Opinion in corresponding PCT Application No. PCT/GB2017/051016 dated Aug. 8, 2017.
(Continued)

*Primary Examiner* — F Daniel Lopez
*Assistant Examiner* — Matthew Wiblin
(74) *Attorney, Agent, or Firm* — Andrus Intellectual Property Law, LLP (57) ABSTRACT

An electro-hydraulic linear actuator module comprising a stator having a cylindrical bore therethrough, a linear electric machine translator movable axially within the stator bore, a positive displacement chamber adjacent each end of the translator for holding, in use, an incompressible fluid, first and second fluid pathways, one to each chamber, for the flow of an incompressible fluid, wherein movement of the translator along the stator bore alters the volumes of the chambers.

19 Claims, 11 Drawing Sheets

(51) Int. Cl.
  *H02K 7/18* (2006.01)
  *F04B 17/04* (2006.01)
  *F04B 9/109* (2006.01)
  *F04B 9/10* (2006.01)
(52) U.S. Cl.
  CPC ......... *F04B 17/048* (2013.01); *H02K 7/1884* (2013.01); *F15B 7/08* (2013.01)

(56) References Cited

U.S. PATENT DOCUMENTS

| | | | |
|---|---|---|---|
| 6,717,283 B2* | 4/2004 | Skinner | E21B 41/0085 290/43 |
| 8,322,447 B2* | 12/2012 | Loretz | E21B 41/0085 166/374 |
| 9,746,004 B2* | 8/2017 | Wamala | F15B 11/04 |
| 2002/0121816 A1* | 9/2002 | Qiu | F16F 15/28 310/51 |
| 2004/0056536 A1 | 3/2004 | Finkbeiner et al. | |
| 2009/0101005 A1* | 4/2009 | Pohl | F01B 11/007 92/85 B |
| 2009/0129951 A1* | 5/2009 | Hyde | F04B 17/04 417/322 |
| 2010/0277012 A1* | 11/2010 | Kobayashi | B60K 6/40 310/30 |
| 2011/0277457 A1* | 11/2011 | Brun | H02K 7/1884 60/408 |
| 2013/0028753 A1* | 1/2013 | Moreira-Espinoza | F04B 17/046 417/53 |
| 2013/0033042 A1 | 2/2013 | Fortier et al. | |
| 2015/0297405 A1* | 10/2015 | Bourne | A61F 9/00736 604/31 |
| 2017/0211557 A1* | 7/2017 | Schmidt | F04B 53/148 |

FOREIGN PATENT DOCUMENTS

| | | |
|---|---|---|
| FR | 2529029 A1 | 12/1983 |
| WO | 8505710 A1 | 12/1985 |
| WO | 0233811 A1 | 4/2002 |

OTHER PUBLICATIONS

GB Search and Examination Report in corresponding GB Application No. 1606513.8 dated Oct. 5, 2016.

* cited by examiner

ACTUATOR MODULE

CROSS-REFERENCE TO RELATED APPLICATIONS

This application is the U.S. national stage application of International Application PCT/GB2017/051016, filed Apr. 12, 2017, which international application was published on Oct. 19, 2017, as International Publication WO2017/178814 in the English language. The international application is incorporated herein by reference, in entirety. The international application claims priority to GB Patent Application No. 1606513.8, filed Apr. 14, 2016, which is incorporated herein by reference, in entirety.

This invention relates to an electro-hydraulic actuator module and, in particular, an electro-hydraulic linear actuator module which includes a linear electric machine and is capable of being operated either as an actuator which generates a force and/or displacement, or as a generator for generating electrical power.

Electric machines are well known and generally contain at least one electrical coil and either a permanent magnet or a magnetic flux carrying element which is capable of moving relative to the coil, magnetic field passing through the coil, and the relative motion producing a change in the magnetic flux that passes through the coil. The most common form of electric machine is a rotating one, in which one element spins within the other, although linear electric machines are also known in which one element reciprocates relative to the other.

One of the elements is typically fixed in position and is called the stator, and the movable element is called the translator. In one arrangement where the machine operates as a motor, i.e. converting electrical energy into mechanical energy, an electric current is applied to the coil which applies an electromagnetic force between the translator and stator leading to movement of the translator relative to the stator. In an alternative arrangement where the machine operates as a generator, i.e. converting mechanical energy into electrical energy, the translator and stator are caused to move relative to each other by the application of an external mechanical force, and this motion of the coil relative to the magnetic field causes a change in the magnetic flux, thereby generating an electric current in the coil.

Furthermore, the invention relates to a linear actuator module having a linear electric machine that incorporates not only linear motion within the module itself, i.e. the motion of the linear electric machine translator, but which links with additional components to form a system that either operates with a linear mechanical motion input to generate an electric current with an electric current input to produce a linear mechanical motion output.

A first example of where a linear mechanical motion output could be utilised is in a dynamic linear test actuator. Dynamic linear test actuators are used to characterise or test the durability of materials, components and assemblies in a wide range of industries. A dynamic linear test actuator applies a varying force to a test subject, and the resulting displacement over time is used to determine the stiffness, durability and other characteristics of the test subject.

Two linear actuator technologies are commonly used for this application:

Servo-hydraulic actuators generate high pressure hydraulic fluid in a separate hydraulic power unit, and one or more servo-valves and hydraulic energy accumulators are used to control the flow of this fluid to and from a hydraulic mover in order to create reciprocating motion. Servo-hydraulic actuators are typically used deliver linear forces ranging from around ten kilonewtons (kN) up to well in excess of a meganewton (MN).

Geared linear electrical actuators use a rotating linear electrical machine to produce a rotating motion which is then converted to a linear motion using a ball screw or other mechanical gearbox arrangement.

Both systems suffer from a number of disadvantages for test actuator applications:

Due to the inertia of the hydraulic fluid and hydraulic power unit, servo-hydraulic actuators are limited to around 100 Hz operating frequency, and require complex software control in order to precisely reproduce a required dynamic test force profile, which is influenced by the system inertia. In addition, servo-hydraulic actuators are noisy, inefficient, require specialist maintenance and can result in hydraulic oil leaks.

Geared linear electrical actuators are also limited by the inertia of the rotating electrical machine and gearbox and typically cannot operate at frequencies over 5 Hz. In addition, the mechanical gearbox introduces problems of wear and backlash which adversely impact system life and performance.

A second example of where a linear mechanical motion output could be utilised is in a linear pump. Linear pumps are typically used where the flow, pressure or environmental requirements are beyond those which can be economically achieved using rotating pumps, an example being production pumps for oil extraction. An induction motor & belt drive connected to a 'nodding donkey' & sucker rod system is the most common linear pump actuator solution for shallow wells, and is a common sight on land based oil extraction sites. This approach is limited to shallow depths due to the requirement for a length sucker rod to transmit a tensile force to the production pump. Extraction of oil from deeper reservoirs, or from shallow end-of-life reservoirs whose well pressure is no longer sufficient for extraction by a linear pump actuated by a sucker rod mechanism, requires an alternative approach for transmitting power down the well and conversion of this power into an upward mechanical force acting on the linear extraction pump.

Transmission of power down the well by hydraulic means with the hydraulic power unit at the surface is a known technology but is not preferred due to leakage, maintenance issues and pipe flow losses. Transmission of power down the well by electrical means is also a known technology. Electrical power may be used to pump oil by means of a rotating electrical submersible pump (ESP), however this solution also has issues with reliability since the close tolerance of pump moving surfaces and seals can be worn by the abrasive and corrosive contaminants present in the oil formation and reservoir. Therefore, the use of a linear electric machine to actuate a linear oil extraction pump is an attractive alternative.

Given the physical constraints of down-well applications where the installed machine diameter is limited by the well bore a series of linear electrical machines may be required. Such a series of machines provide several benefits including:

Configuration flexibility according to the pumping power output required, which can be achieved by varying the number of linear electrical machines;

Accommodation of angular misalignment between adjacent linear electrical machines meaning that a set of linear electrical machines can operate within bores that are not perfectly straight.

Where a series of discrete linear electrical machine modules are installed within a curved well bore to form a single longer linear electrical machine, the translators for each individual stator section within a linear electrical machine module must not travel into the stator bore of an adjacent linear electrical machine module since the angle between adjacent modules could cause the protruding translator to seize in the bore of the adjacent stator section.

A mechanical coupling method could directly couple each translator together using a series of linkages. However, this arrangement would result in a significant extension of the overall machine length since the mechanical linkages would extend each electrical machine module's length by at least the pump actuator's stroke. This would increase the size and cost of the pump actuator. In addition, this arrangement would be vulnerable to single point failure modes throughout the length of the machine in that, should one of the mechanical links or one of the linear electrical machines fail, then the entire pump actuator would fail.

The present invention is aimed at addressing one or more of the problems identified in the two applications described above.

According to the present invention, there is provided an electro-hydraulic linear actuator module comprising: a stator having a cylindrical bore therethrough; a linear electric machine translator movable axially within the stator bore; a positive displacement chamber adjacent each end of the translator for holding, in use, an incompressible fluid; first and second fluid pathways, one to each chamber, for the flow of an incompressible fluid, wherein movement of the translator along the stator bore alters the volumes of the chambers.

The present invention also provides an electro-hydraulic linear actuator module comprising: a stator having a cylindrical bore therethrough; a linear electric machine translator movable axially within the stator bore; a positive displacement chamber adjacent each end of the translator for holding, in use, an incompressible fluid; first and second fluid pathways, one to each chamber, for the flow of an incompressible fluid, wherein, in use, the incompressible fluid in one of the chambers either transmits a force to, or receives a force from, the translator.

The invention also provides a linear electro-hydrostatic actuator system comprising: an electro-hydraulic linear actuator module as described above; and a hydraulically operated linear mover module comprising: a hydraulically operated linear mover; and a positive displacement chamber adjacent each end of the hydraulically operated linear mover for holding, in use, an incompressible fluid, wherein at least one chamber of the hydraulically operated linear mover module is fluidly connected to a fluid pathway so that, in use, movement of one of the translator or the hydraulically operated linear mover causes movement of the other.

The invention further provides an actuator system comprising: at least one of the electro-hydraulic linear actuator modules as described above; a hydraulically operated linear mover module comprising: a hydraulically operated linear mover; and a positive displacement chamber adjacent each end of the hydraulically operated linear mover for holding, in use, an incompressible fluid, wherein at least one chamber of the hydraulically operated linear mover module is fluidly connected to a fluid pathway so that, in use, movement of the translator causes movement of the hydraulically operated linear mover.

The invention further provides an electrical generator system comprising: at least one of the electro-hydraulic linear actuator modules as described above; a hydraulically operated linear mover module comprising: a hydraulically operated linear mover; and a positive displacement chamber adjacent each end of the hydraulically operated linear mover for holding, in use, an incompressible fluid, wherein at least one chamber of the hydraulically operated linear mover module is fluidly connected to a fluid pathway so that, in use, movement of the hydraulically operated linear mover causes movement of the translator.

The invention further provides a method of operating an electro-hydraulic linear actuator module or a system as described above, the method comprising: providing a hydraulic fluid in at least one of the fluid pathways; and either applying an electrical current to the linear electrical machine to cause the translator to move and thereby reduce the volume of one of the chambers and displace hydraulic fluid from that chamber, or driving the hydraulically operated linear mover to displace hydraulic fluid into one of the pathways and thereby expanding the volume of one of the chambers to move the translator relative to the stator.

The present invention therefore provides a number of advantages and benefits over the known modules. Firstly, the use of hydraulics with a linear electrical machine means that a linear output can easily be created, and such a linear output is beneficial in many applications, not just the linear actuator and linear pump applications discussed above.

The provision of hydraulic fluid as the force transmission medium allows for the parallel, rather than series, coupling of multiple modules, which offers installation and operational flexibility and redundancy benefits. In the mechanical coupling arrangement previously described, if one machine or link fails, the whole pump actuator fails. With the hydraulic transmission of force and motion, if a proportion of the linear electric machines or modules fail, the pump actuator may continue to operate with the remainder of the linear electric machines as the failed linear electric machines or modules do not prevent continuing operation of the other linear electric machines or modules.

The use of hydraulics to transmit force from the translator also permits a simple hydraulic gearing arrangement that can be utilised to multiply the linear force of each electrical machine. For example, if the hydraulic acting area of the hydraulically operated linear mover is 10 times the hydraulic acting area of the linear electrical machine translator, the force applied by the hydraulic pressure on the hydraulically operated linear mover will be a factor of 10 greater than the force applied by the translator on the fluid.

An end cap is typically provided at each end of the stator. At least part of one of the fluid pathways may be within an end cap. Each chamber may be defined at least by the stator, an end of the translator and one of the end caps.

The module may further comprise a pair of concentric tubes co-axial with the stator and translator, one tube associated with each chamber, wherein each fluid pathway passes within a respective tube. The tubes may pass through at least one of the end caps. One or more of the tubes may have an aperture to place the tube in fluid communication with a respective chamber.

A connecting conduit may be provided in one of the end caps through which one of tubes is placed in fluid communication with one of the chambers. Connecting conduits may be included in each end cap, and more than one conduit may be provided if required.

The stator and the translator preferably define a gap therebetween and the gap may contain incompressible fluid, typically the same fluid as is used as the incompressible fluid in the remainder of the invention.

One or more hydraulic fluid control rings may be provided between the stator and the translator. Additionally or alternatively, one or more hydraulic seals may be provided between the stator and the translator and/or between the translator and the tube passing through the translator.

The invention preferably includes one or more hydrodynamic bearings between the stator and translator. Such bearings provide a radial hydrodynamic reaction force through axial shear of a fluid and support side loads generated by the electrical machines. These bearings should also be able operate using the hydraulic working fluid of the hydraulically operated linear mover module, and provide durable and reliable operation throughout the operational life of the actuator. Hydrodynamic bearings are typically formed by a surface parallel to the motion, this surface being fixed to either the stator or translator, and an inclined surface being fixed to the other of the stator and translator.

The hydraulic acting areas of the hydraulic mover module chambers may each be greater than the hydraulic acting areas of the electro-hydraulic linear actuator module chambers so that when pressure is applied to the incompressible fluid by an input force at the translator, the force applied by the fluid on the hydraulically operated linear mover is greater than the force applied by the fluid on the translator.

The hydraulic acting areas of the hydraulic mover module chambers may each be less than the hydraulic acting areas of the electro-hydraulic linear actuator module chambers so that when pressure is applied to the incompressible fluid by an input force at the translator, the resulting force applied by the fluid on hydraulically operated linear mover is less than the force applied by the fluid on the translator.

The displaced hydraulic fluid moving between the linear electrical machine module and the hydraulically operated linear mover module could be passed through a cooling module to dissipate heat from the linear electrical machine coils by means of an in-line heat exchanger or thermal mass or other surface features. The flow/return path from the linear electric machine to the multiplier module creates the option of passing the hydraulic fluid through further cooling modules over a longer axial length in order to dissipate a greater amount of heat from the linear electric machines over a larger area than is possible with a single cooling module.

The cooling module may remove heat from one or more of the fluid pathways. Multiple cooling modules may be provided and can be associated with one or more fluid pathways. Different cooling modules could be used on each fluid pathway. Each cooling module may be associated with a respective electro-hydraulic linear actuator module.

The fluid pathways may be arranged such that, in use, the motion of the translator and the hydraulically operated linear mover are in opposite directions, or may be in the same direction. Movement in opposite directions can be helpful when trying to balance the system, and such balance will also be dependent upon the mass of the moving elements and the distance they each travel.

The first fluid pathway of each electro-hydraulic linear actuator module may be connected to the same chamber of a common hydraulically operated linear mover module. This allows each electro-hydraulic linear actuator module to add to the overall movement of the hydraulically operated linear mover, or indeed for the hydraulically operated linear mover to drive a plurality of translators.

The second fluid pathway of each electro-hydraulic linear actuator module may also be connected to a single chamber of the common hydraulically operated linear mover module to form a closed hydraulic system whose total internal fluid volume is independent of the position of the movable elements, thereby eliminating the need for a hydraulic accumulator or other such device to receive the net fluid displaced from the chambers and pathways of the system.

Alternatively, the first fluid pathway of one electro-hydraulic linear actuator module and the second fluid pathway of a second electro-hydraulic linear actuator module may be connected to the same chamber of the common hydraulically operated linear mover module. In this arrangement, one electro-hydraulic linear actuator module can act as an actuator and another electro-hydraulic linear actuator module can act as a generator. Such a system could be beneficial as a power converter.

A plurality of electro-hydraulic linear actuator modules may be positioned along a common axis and may further comprise common fluid pathways being formed within flow tubes arranged in parallel with the axis.

Typically, individual stator sections are preferably no more than 0.5 m in length due to manufacturing considerations. In in-line configurations that need to accommodate a small amount of curvature, this means that individual stator sections could be non-coaxial and the coupling of adjacent linear electrical machine modules together must reliably accommodate this potential misalignment.

The present invention will now be described with reference to the accompanying figures, in which.

Figure 1:
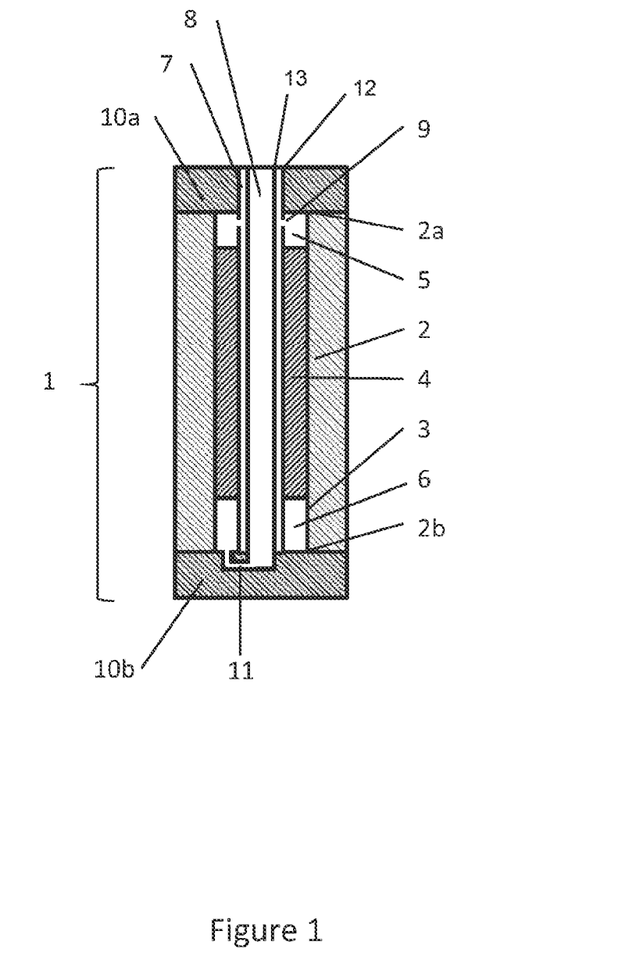
FIG. 1 is an axial cross section through a first electro-hydraulic linear actuator module.

FIG. 1 shows an electro-hydraulic linear actuator module 1 in accordance with the invention. The module includes a stator 2 having a cylindrical bore 3 therethrough. The bore is typically circular in cross section, although other cross section shapes would be possible, including curved cross sections (such as circular, elliptic, parabolic, hyperbolic) or polygon sections (such as triangular, square or rectangular). A translator 4 is located within the bore and is capable of axial movement (up and down in the figures) within the stator bore 3. The two ends 2a, 2b of the stator are closed by respective end caps 10a, 10b, thereby defining a first chamber 5 at one end 2a of the stator, and a second chamber 6 at the other end 2b of the stator.

The stator 2 typically includes one or more stator coils (not shown) and the translator typically includes either some permanent magnet material or some magnetically permeable material, so that, in use, either relative motion between the translator and the stator causes an electrical current to flow in the coils (generator mode), or the application of an electric current to the coils causes an electromagnetic force to be applied between the translator and the stator (actuator mode).

First 7 and second 8 fluid pathways are provided from outside the module 1 to respective chambers 5, 6. The pathways are typically within continuous tubes 12, 13, although it may be possible for the tubes to extend over only part of the pathway with the module 1, with, for example, the portion of the pathway in end cap 10 being formed by the end cap itself.

The first fluid pathway 7 is formed within a tube 12 which passes through end cap 10*a* and extends axially through the translator 4 by way of a translator bore 4*a*. The first fluid pathway 7 is in fluid communication with the first chamber 5 by way of a connecting aperture 9 in an outer wall of the tube 12 to allow fluid, in this case hydraulic fluid, into and out of the first chamber 5.

The second fluid pathway 8 is formed within a second tube 13 which is, in this example, located within the first tube 12 and typically coaxial with the first tube 12. The second fluid pathway extends into end cap 10*b*, and is in fluid communication with the second chamber 6 by way of a connecting conduit 11 to allow fluid, in this case hydraulic fluid, into and out of the second chamber 6.

Alternative arrangements for the fluid pathways are possible and, depending upon the configuration of multiple modules as described in later figures, the fluid pathways do not need to be concentric/coaxial, do not need to pass through the translator and may travel in different directions completely, and may pass either in part or entirely outside the linear electrical machine module. Depending upon the configuration, one or more of the end caps may include one or more pass-through features (e.g. the flow tubes 12, 13 passing through end cap 10*a* of FIG. 1) to communicate fluid flow and/or return to adjacent modules. As an alternative, one or more end caps may contain only internal fluid routing (e.g. connecting conduit 11 of end cap 10*b* in FIG. 1).

Figure 11:
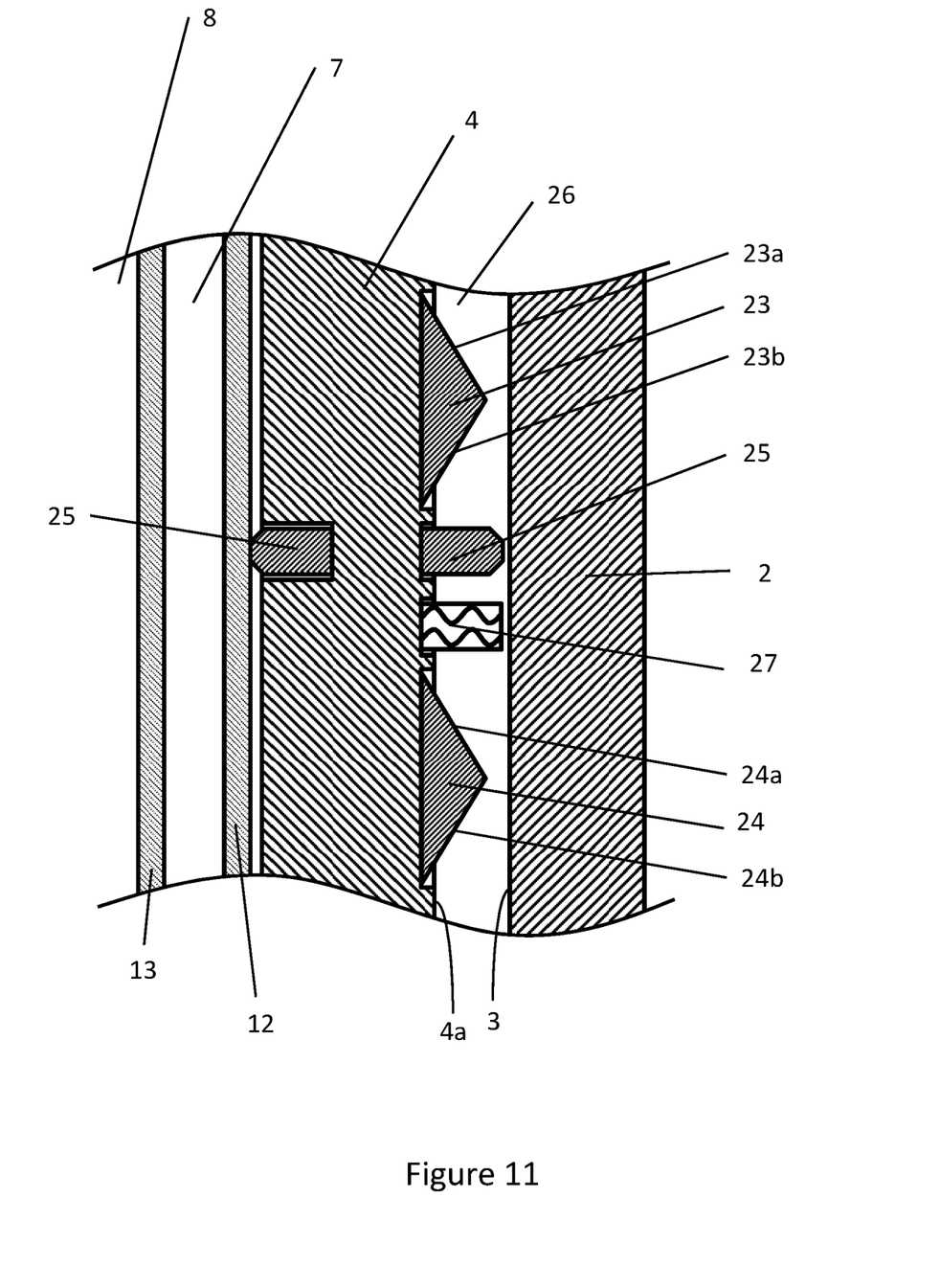
FIG. 11 is a close up axial cross section showing the hydrodynamic bearings, fluid seal and fluid ring features.

A close up view of the interface between the stator 2 and the translator 4 is shown in FIG. 11. A pair of hydrodynamic bearing elements 23, 24 are mounted within a recess on the outer surface 4*a* of the translator 4 and extend radially outwards into the gap 26 between the stator 2 and the translator 4. Each bearing element has a pair of surfaces 23*a* and 23*b*, 24*a* and 24*b*, each surface being inclined relative to the surface of the stator bore 3.

Those bearing elements interact with the surface of the stator bore 3 to form a hydrodynamic bearing which provides a radial hydrodynamic reaction force through shear of the fluid. A pair of bearing elements is shown in this example (an upper 23 and a lower 24 bearing element in FIG. 11), although more than two could be used.

The bearing elements 23, 24 extend circumferentially around the translator act to keep the translator 4 centralised within the stator bore 3 and to react against any electromagnetic side loads.

In operation, an incompressible hydraulic fluid is provided within both first 5 and second 6 chambers, and with the first 7 and second 8 fluid pathways. The fluid completely fills the pathways and the chambers, and indeed fills gap 26 as well. One or more hydraulic fluid pressure seals 25 (two are shown in FIG. 11) may be included so as to prevent pressure loss by leakage of hydraulic fluid along the gap 26 between the stator 2 and the translator 4, and along the corresponding inner gap between the tube 12 and the translator 4. Each seal 25 is mounted in another recess within the inner or outer surface of the translator 4. This means that more complex bearings and/or fluid seals are not required between the stator and translator, thereby simplifying construction and operation. Additionally, in this arrangement, a hydraulic fluid control ring 27 may also be provided, mounted in a further recess within the outer surface 4*a* of the translator 4. It is likely that only one hydraulic fluid control ring 27 and one hydraulic fluid pressure seal 25 would be used, and would be mounted at or close to the midpoint of the translator along its axial length.

At least two bearing elements 23, 24 are preferable since the hydraulic fluid control ring 27 should be upstream of at least one of the bearing elements in each direction of travel. In addition, the translator side load (which is typically axially distributed) is reacted against by two or more axially separated hydrodynamic bearings 23 & 24 to ensure the side load and bearing support do not produce a force couple acting to rotate the translator and cause this to seize in the stator bore 3. In practice, more than two bearing elements would typically be used to support the translator on both sides of the centrally mounted hydraulic fluid ring and/or pressure seal.

Both the hydraulic fluid pressure seal 25 and hydraulic fluid control ring 27 could be in contact with the surface of the stator bore 3, but in practice a boundary layer would remain. It is preferable that there is a defined leakage area in order to permit some hydraulic fluid flow between the hydrodynamic bearing surfaces 23*a*, 23*b*, 24*a*, 24*b* and the surface of the stator bore 3. In each case the gap section area (which could be an annulus or other defined shape) is preferably smaller than the gap section area between the bearing and the stator 2.

Figure 2:
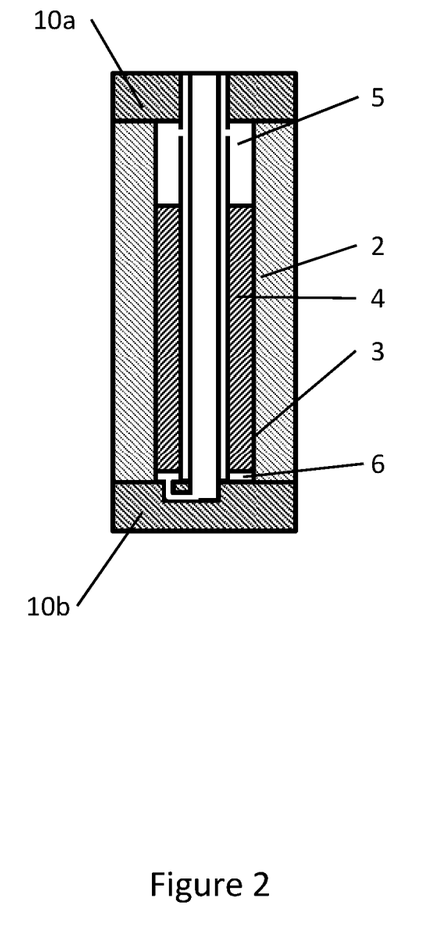
FIG. 2 is an axial cross section of the module of FIG. 1 in a first position.
Figure 3:
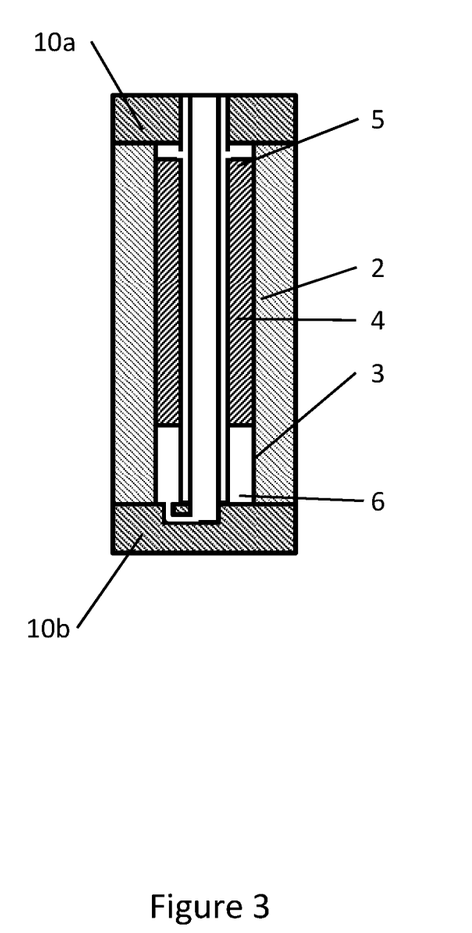
FIG. 3 is an axial cross section of the module of FIG. 1 in a second position.

FIGS. 2 and 3 show respectively first and second positions of the translator 4 within the stator bore 3. As the translator moves from the first position in FIG. 2 to the second position in FIG. 3, the volume of the first chamber is decreased, whilst the volume of the second chamber increases. As the translator moves from the second position in FIG. 3 to the first position in FIG. 2, the volume of the second chamber is decreased, whilst the volume of the first chamber increases. The positions shown in FIGS. 2 and 3 are not necessarily the extreme positions—by this, we mean that the translator 4 could move to either or both extents of the stator bore 3, depending upon the shape of the stator bore at its end and also on the amount of fluid that can be displaced. In the way, the volume of either or both chambers 5, 6 could be reduced to zero at a point in the operation cycle of the module 1.

The electro-hydraulic linear actuator module 1 can, as described above, be operated as either an actuator or a generator. When being operated as an actuator, it is the application of an electric current which causes, in a widely known manner, motion of the translator. The electric current causes for example movement of the translator 4 from the first position to the second position, thereby displacing the hydraulic fluid from the first chamber 5 under pressure. The displaced hydraulic fluid can be utilised to drive a hydraulic actuator or other linear mover, as will be described later.

When being operated as a generator, it is the introduction of a hydraulic fluid at pressure through one of the hydraulic fluid pathways which causes motion of the translator. The increased pressure, for example in second fluid pathway 8 and in second chamber 6 is not balanced by an increase in pressure in the first chamber 5, so the translator 4 is caused to move (upwards in the figures). This translator motion relative to the stator 2 causes, in a widely known manner, an electric current to be generated in the stator coils.

Figure 4:
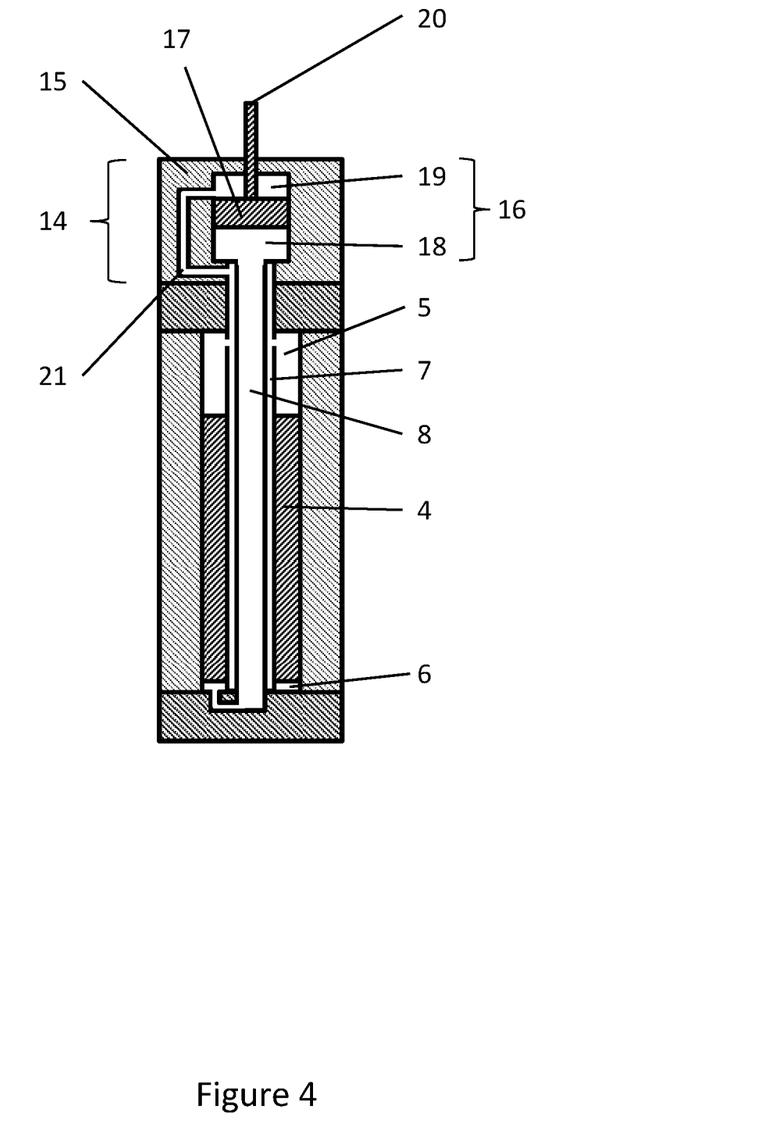
FIG. 4 is an axial cross section through a module of FIG. 1 in the first position with a hydraulic multiplier module.
Figure 5:
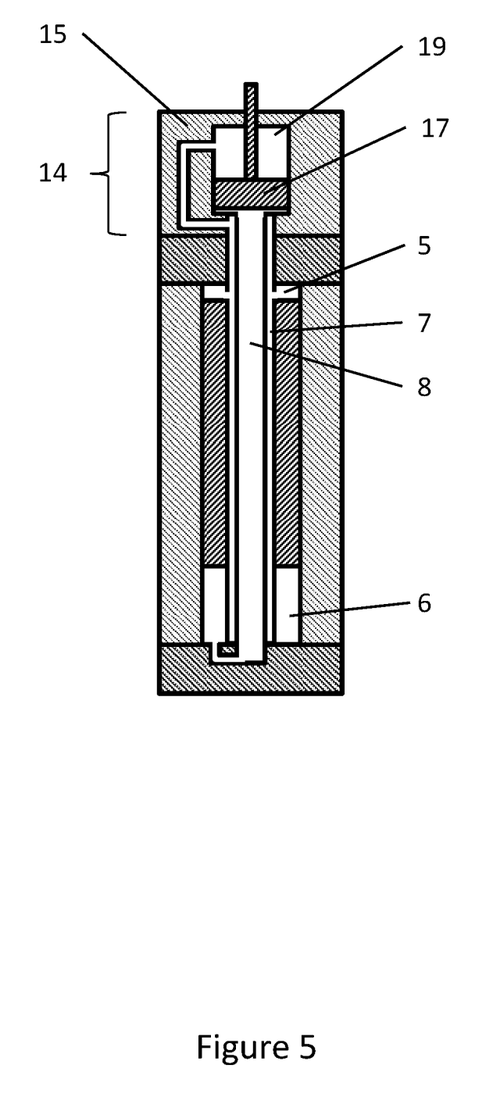
FIG. 5 is an axial cross section through a module of FIG. 1 in the second position with a hydraulic multiplier module.

FIGS. 4 and 5 show the module 1 of FIGS. 1 to 3, but with the inclusion of a hydraulically operated linear mover module 14, thereby forming a linear electro-hydrostatic actuator system. FIG. 4 corresponds to the first position of FIG. 2 and FIG. 5 corresponds to the second position of FIG. 3.

The hydraulically operated linear mover module 14 has a main body 15 in which a cavity 16 is formed. A hydraulically operated linear mover 17 is located within the cavity and divides the cavity into a third chamber 18 and a fourth chamber 19. The hydraulically operated linear mover 17 has a force coupling element 20 that passes through the main body 15 and permits motion of the linear mover to be utilised outside of the hydraulically operated linear mover module 14 (actuator mode), or for an external force to applied to the linear mover 17 (generator mode).

The third chamber 18 is in fluid communication with the second fluid pathway 8, and the fourth chamber 19 is in fluid communication with the first fluid pathway 7 by way of a second connecting conduit 21. In this configuration, movement of the hydraulically operated linear mover 17 and the translator 4 will be in opposite directions, as fluid expelled from the third chamber by motion of the linear mover 17 (downwards in the figures) displaces hydraulic fluid to cause an increase in the volume of the second chamber and upward movement of the translator. This can be seen by comparing the relative positions of the linear mover 17 and the translator in FIGS. 4 and 5. The fluid connections could be configured such that the linear mover and the translator move in the same direction, although the opposite motion has benefits in helping to balance the overall system leading to smoother operation. The extent to which the force balance is complete will depend upon the relative masses of the hydraulically operated linear mover 17 and the translator 4.

The hydraulically operated linear mover module 14 also functions as a force multiplier. Force multiplication is a function of the linear mover module 14 due to the hydraulic acting area (i.e. the surface area of the linear mover which is exposed to the pressurised hydraulic fluid) of the third 18 and fourth 19 chambers being greater or smaller than the hydraulic acting areas of the translator 4 in first 5 and second 6 chambers so that the displaced fluid produces a smaller or greater axial motion of the linear mover 17 than the translator 4.

Figure 6:
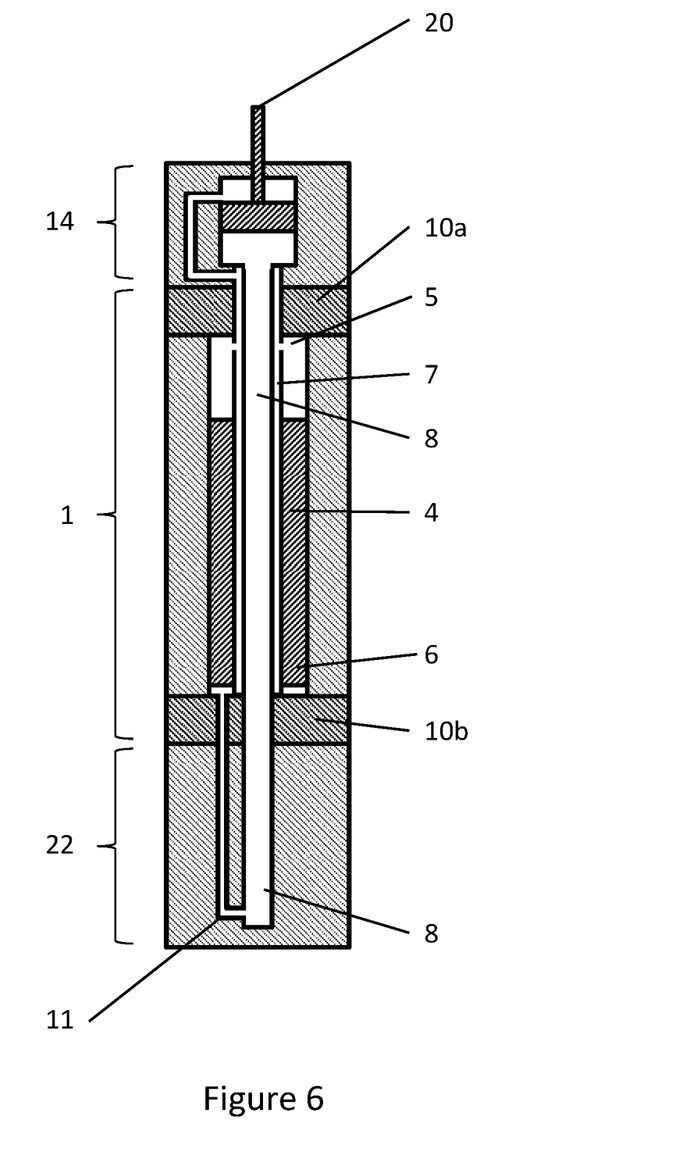
FIG. 6 is an axial cross section of a linear electrical actuator system including a cooling module.

FIG. 6 shows the modules of FIGS. 4 and 5 together with a fluid cooling module 22 for dissipating heat from the hydraulic fluid within the second fluid pathway 8. The cooling module is located such that the hydraulic fluid passes via the cooling module between the linear mover module 14 and the electro-hydraulic linear actuator module 1. In the cooling module 22, heat from the hydraulic fluid is dissipated by means of an in-line heat exchanger or thermal mass or other surface features. This is what is meant by the cooling module being between the hydraulically operated linear mover module and the electro-hydraulic linear actuator module. It is not the physical location that is important, but rather the location of the cooling of the fluid in the fluid pathway. The cooling module 22 may include an extension to the second fluid pathway 8 using a longer second tube 13, which passes through end cap 10b. The connecting conduit 11 may be used to pass fluid through the end cap 10b from the second tube 13 to second chamber 6. A number of alternative fluid pathway routes are possible to connect one or more fluid pathways of an electro-hydraulic linear actuator module 1 to cooling module 22.

Figure 7:
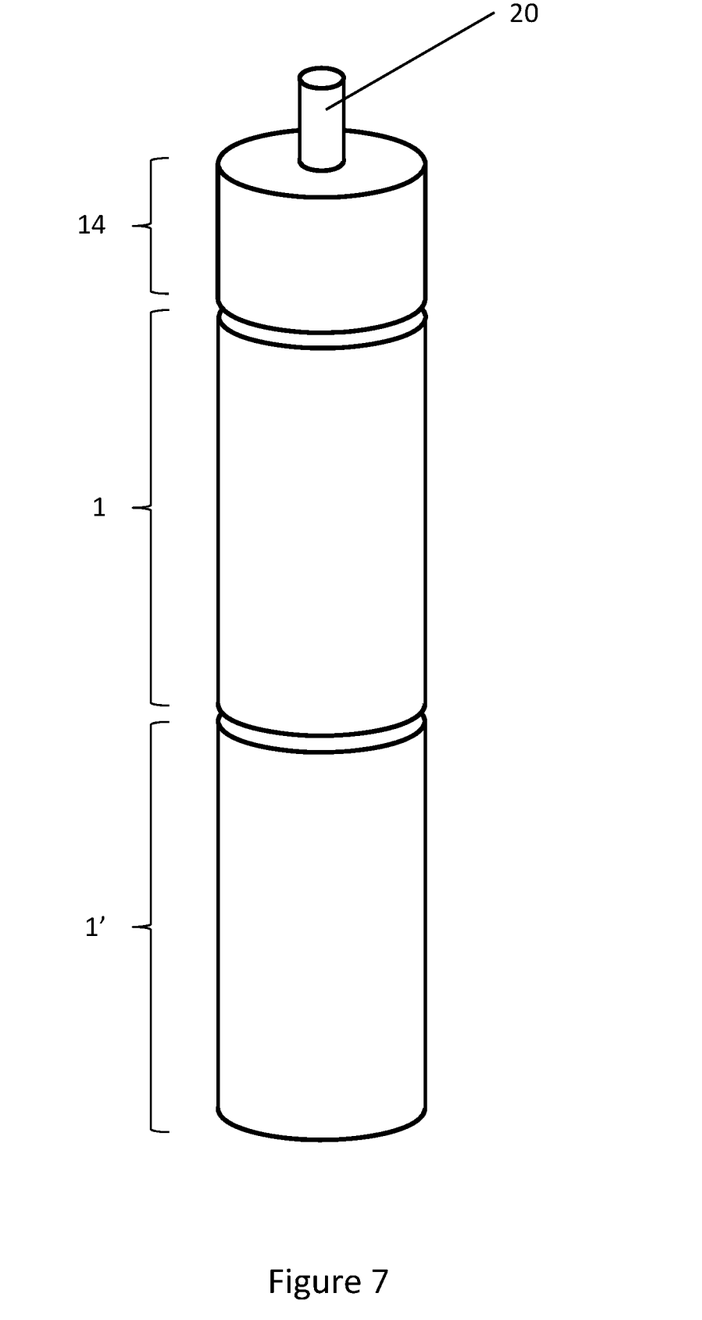
FIG. 7 is an external view of a linear electrical actuator system including plurality of modules in the common axis arrangement.
Figure 8:
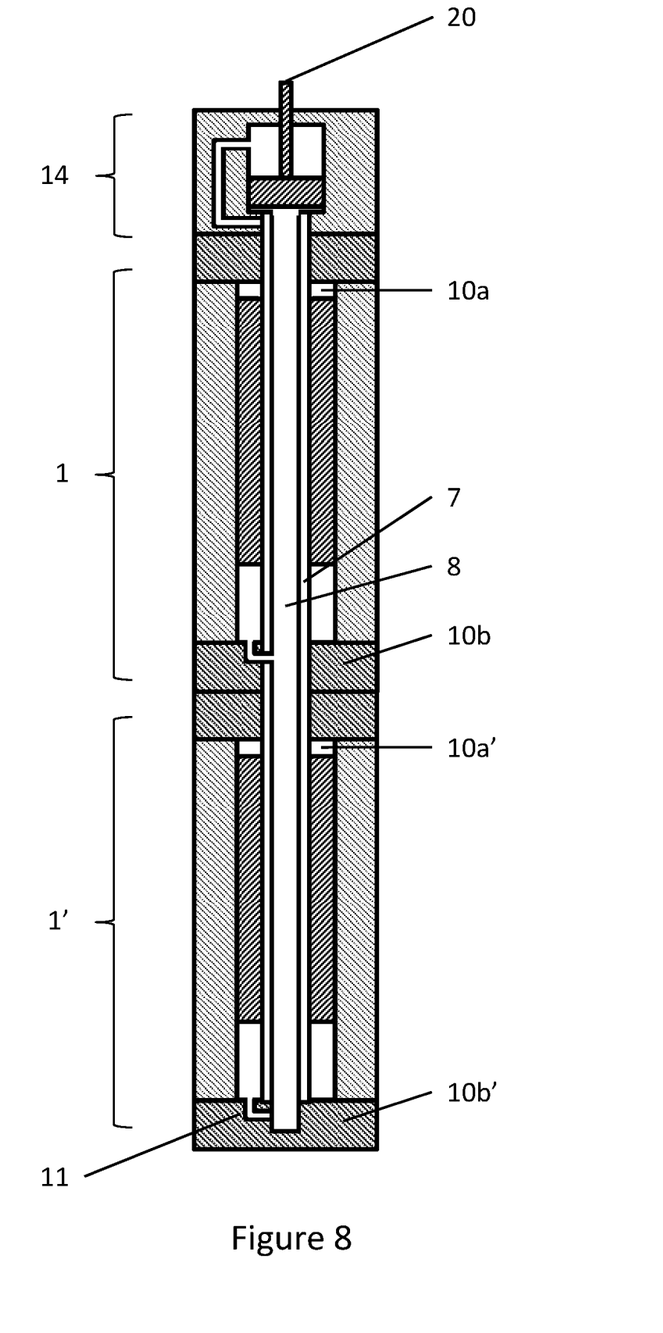
FIG. 8 is an axial cross section through the system of FIG. 7.

FIGS. 7 and 8 show a first configuration of a multi module system, in which two electro-hydraulic linear actuator modules 1, 1' are provided. One or more of these may also include a cooling module 22. In FIGS. 7 and 8, the upper electro-hydraulic linear actuator module 1 is connected to a hydraulically operated linear mover module 14 as per the arrangement of FIGS. 4 and 5. The difference is in the inclusion of a second, lower electro-hydraulic linear actuator module 1'.

The second electro-hydraulic linear actuator module 1' is, in this example, identical to electro-hydraulic linear actuator module 1, save for end cap 10a'. In this arrangement, end cap 10a' includes a simple pass through arrangement permitting both first 7 and second 8 fluid pathways to continue into second electro-hydraulic linear actuator module 1'. In this way, the first and second fluid pathways act as common fluid pathways, such that both electro-hydraulic linear actuator modules can operate in parallel rather than series. It will be readily understood that, if electro-hydraulic linear actuator module 1 were to fail or jam for some reason, whilst that module would no longer operate, it would not prevent electro-hydraulic linear actuator module 1' from working. As such, this arrangement allows for greater redundancy in the event of a linear electrical machine module failure, as otherwise the entire system would cease to operate.

Additional electro-hydraulic linear actuator modules could be added below electro-hydraulic linear actuator module 1', making the system expandable depending upon the specific load and operational redundancy requirements of a particular task or location. Such a configuration would therefore have multiple modules 1 positioned along a common axis, optionally with common fluid supplies being flow tubes arranged in parallel with this axis and passing through one or more of the electro-hydraulic linear actuator modules.

Figure 9:
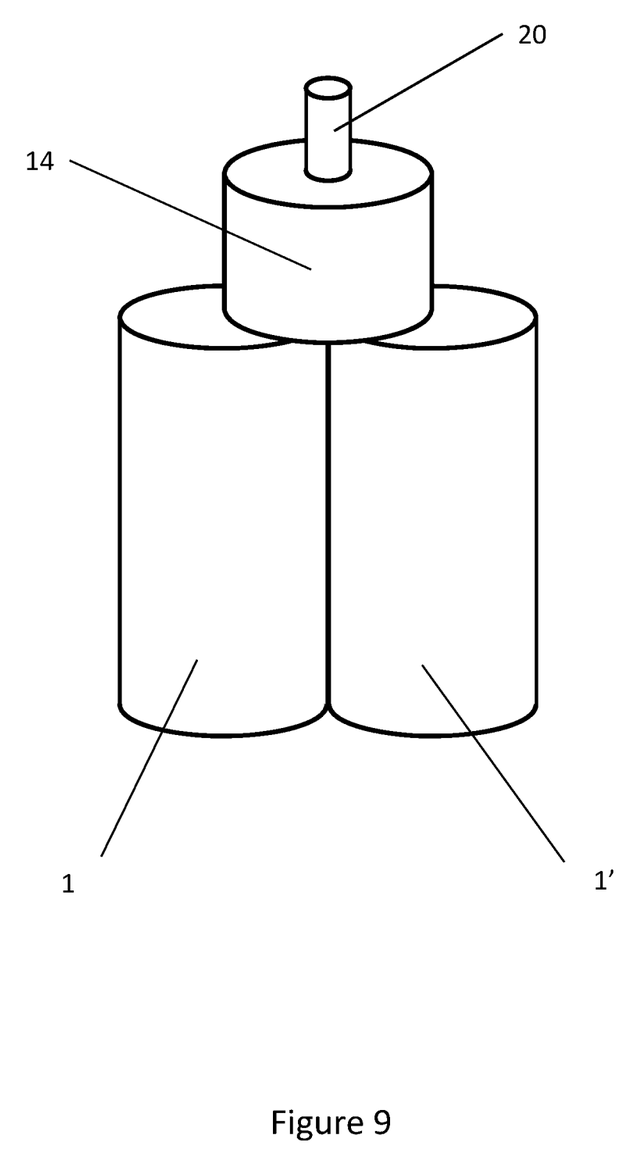
FIG. 9 is an external view of a linear electrical actuator system including plurality of modules in the compact arrangement.
Figure 10:
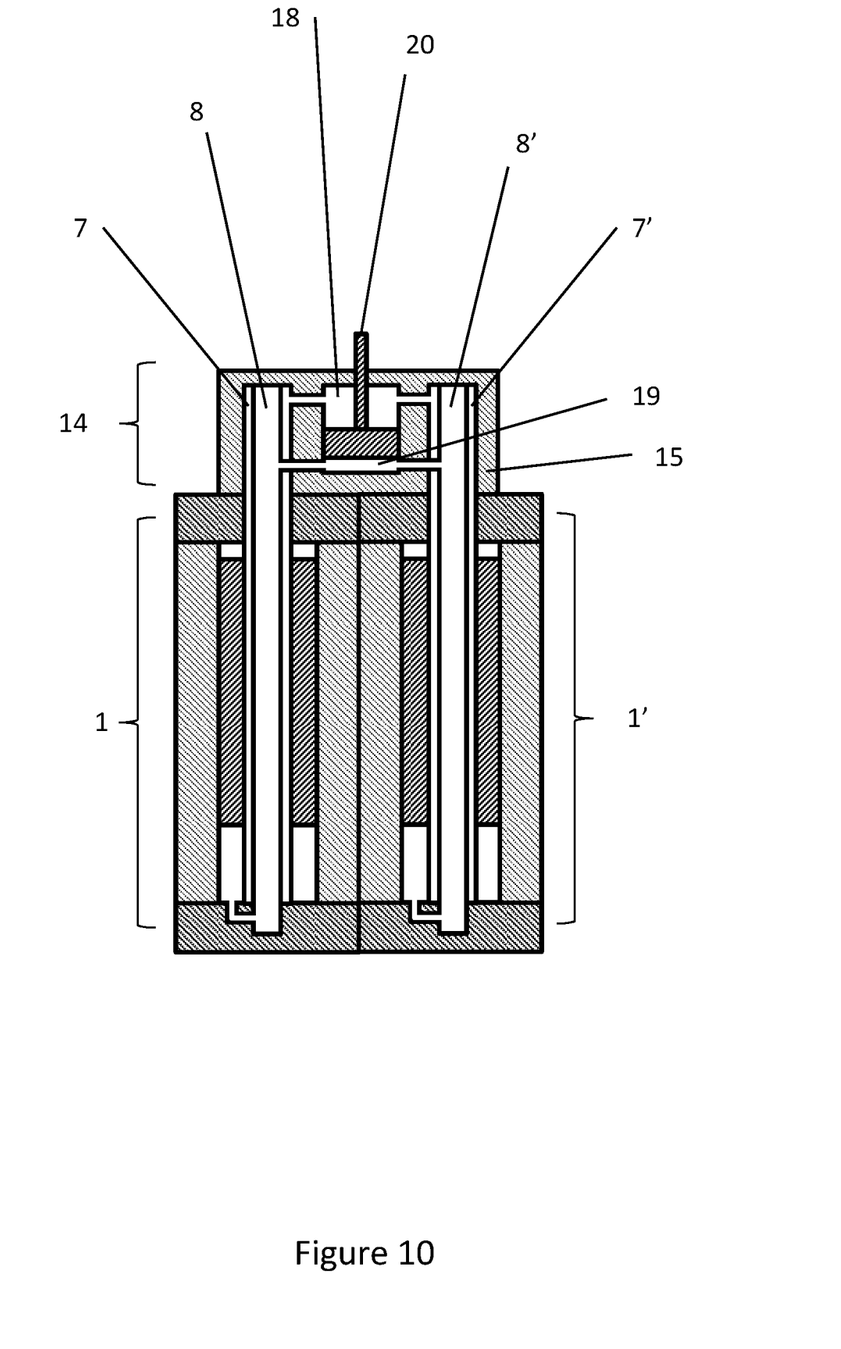
FIG. 10 is an axial cross section through the system of FIG. 9.

A further configuration of multiple modules is shown in FIGS. 9 and 10. Here the multiple modules 1, 1' are arranged in a compact form—that is, each module has its own first 7, 7' and second 8, 8' fluid pathways connected to the respective third 18 and fourth 19 chambers of a common hydraulically operated linear mover module 14. In the example embodiment shown in FIG. 10 the fluid connections between fluid pathways and the third 18 and fourth 19 chambers are made within the main body 15. Depending upon the number of electro-hydraulic linear actuator modules that are connected to a common hydraulically operated linear mover module, one or more separate manifolds (not shown) may be required between a group of electro-hydraulic linear actuator modules and the common hydraulically operated linear mover module.

Just as with the common axis arrangement, each electro-hydraulic linear actuator module operates irrespective of whether or not another electro-hydraulic linear actuator module fails, thereby again providing a system in which the multiple electro-hydraulic linear actuator modules can operate in parallel rather than series.

In linear test actuator applications, the flexibility in construction and operation that is offered by the compact arrangement allows a family of different test actuators, each having different force and operating frequency characteristics, to be constructed from a small sub-set of common linear electrical machine modules and hydraulically operated linear mover modules. This approach offers cost reduction benefits due to the larger manufacturing volumes of the common modules. Alternatively, different linear electrical machine modules having different force and operating frequency characteristics could be connected to a common hydraulically operated linear mover module in order to provide a broader range of force, displacement and frequency capabilities than would be possible with a number of identical linear electrical machine modules.

Cooling modules 22, in the form shown in FIG. 6, could be associated with one or more of the electro-hydraulic linear actuator modules. A cooling module may receive hydraulic fluid from a number of different electro-hydraulic linear actuator modules. Alternatively, several cooling modules may receive hydraulic fluid from a smaller number of electro-hydraulic linear actuator modules.

The invention claimed is:

1. A linear electro-hydrostatic actuator system comprising:
   an electro-hydraulic linear actuator module comprising:
   a stator having a cylindrical bore therethrough;
   a linear electric machine translator movable axially within the cylindrical bore;
   a positive displacement chamber adjacent each end of the translator for holding, in use, an incompressible fluid;
   first and second fluid pathways, one leading into each chamber, for the flow of the incompressible fluid into and/or out of the respective chamber,
   wherein movement of the translator along the cylindrical bore alters volumes of the chambers; and
   a hydraulically operated linear mover module comprising:
   a hydraulically operated linear mover; and
   a positive displacement chamber adjacent each end of the hydraulically operated linear mover for holding, in use, an incompressible fluid,
   wherein at least one chamber of the hydraulically operated linear mover module is fluidly connected to one of the first or second fluid pathways so that, in use, movement of one of the linear electric machine translator or the hydraulically operated linear mover causes movement of the other;
   a pair of concentric tubes co-axial with the stator and the translator, one tube associated with each chamber, wherein each fluid pathway passes within a respective tube.

2. A system according to claim 1, further comprising one or more hydrodynamic bearings between the stator and the translator.

3. A system according to claim 1, wherein the stator and the translator define a gap therebetween.

4. A system according to claim 3, wherein, in use, the gap contains the incompressible fluid.

5. A system according to claim 3, further comprising one or more hydraulic fluid control rings between the stator and the translator.

6. A system according to claim 3, further comprising one or more hydraulic seals between the stator and the translator.

7. A system according to claim 3, further comprising an end cap at each end of the stator.

8. A system according to claim 7, wherein at least part of one of the fluid pathways is within one of the end caps.

9. A system according to claim 7, wherein each chamber of the electro-hydraulic linear actuator is defined at least by the stator, an end of the translator and one of the end caps.

10. A system according to claim 1, wherein the tubes pass through an end cap.

11. A system according to claim 10, wherein at least one of the tubes has an aperture to place the tube in fluid communication with a respective chamber.

12. A system according to claim 10, further comprising a connecting conduit in one of the end caps through which one of tubes is placed in fluid communication with one of the chambers.

13. A system according to claim 1, wherein hydraulic acting areas of the hydraulically operated linear mover module chamber are each greater than hydraulic acting areas of the electro-hydraulic linear actuator module chamber so that when pressure is applied to the incompressible fluid by an input force at the translator, the force at the hydraulically operated linear mover is greater than the force applied at the translator.

14. A system according to claim 1, wherein hydraulic acting areas of the hydraulically operated linear mover module chamber are each less than hydraulic acting areas of the electro-hydraulic linear actuator module chamber so that when pressure is applied to the incompressible fluid by an input force at the translator, the force at the hydraulically operated linear mover is less than the force applied at the translator.

15. An actuator system comprising:
    a linear electro-hydrostatic actuator system according to claim 1,
    wherein movement of the translator causes movement of the hydraulically operated linear mover.

16. An electrical generator system comprising:
    a linear electro-hydrostatic actuator system according to claim 1,
    wherein movement of the hydraulically operated linear mover causes movement of the linear translator.

17. A system according to claim 1, further comprising a plurality of the electro-hydraulic linear actuator modules.

18. An actuator system according to claim 17, wherein the plurality of electro-hydraulic linear actuator modules are positioned along a common axis.

19. A method of operating a system according to claim 1, the method comprising:
    providing the incompressible fluid in at least one of the first or second fluid pathways; and
    either applying an electrical current to the stator to cause the linear electrical machine translator to move and thereby reduce the volume of one of the chambers and displace the incompressible fluid from that chamber, or
    driving the hydraulically operated linear mover to displace hydraulic fluid into one of the pathways and thereby expanding the volume of one of the chambers of the electro-hydraulic linear actuator to move the linear electrical machine translator relative to the stator.

* * * * *